US012451106B2

(12) United States Patent
Thio et al.

(10) Patent No.: US 12,451,106 B2
(45) Date of Patent: Oct. 21, 2025

(54) AUTOMATIC AND INTERACTIVE MASHUP SYSTEM

(71) Applicant: Lemon Inc., Grand Cayman (KY)

(72) Inventors: Vibert Thio, Los Angeles, CA (US); Bochen Li, Los Angeles, CA (US); Haonan Chen, Culver City, CA (US); Jitong Chen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 797 days.

(21) Appl. No.: 17/737,258

(22) Filed: May 5, 2022

(65) Prior Publication Data

US 2023/0360618 A1 Nov. 9, 2023

(51) Int. Cl.
*G10H 1/00* (2006.01)

(52) U.S. Cl.
CPC ..... *G10H 1/0008* (2013.01); *G10H 2210/076* (2013.01); *G10H 2210/265* (2013.01); *G10H 2210/391* (2013.01); *G10H 2220/116* (2013.01); *G10H 2240/325* (2013.01)

(58) Field of Classification Search
CPC ........... G10H 1/0008; G10H 2210/076; G10H 2210/265; G10H 2210/391; G10H 2220/116; G10H 2240/325
USPC ........................................................... 84/602
See application file for complete search history.

(56) References Cited

U.S. PATENT DOCUMENTS

| | | | | |
|---|---|---|---|---|
| 8,855,334 | B1 * | 10/2014 | Lavine | H04M 19/04 381/119 |
| 10,614,785 | B1 * | 4/2020 | Dabby | G10H 1/0008 |
| 2008/0249644 | A1 * | 10/2008 | Jehan | G11B 27/322 |
| 2021/0201863 | A1 * | 7/2021 | Bosch Vicente | G10H 1/0008 |
| 2021/0241738 | A1 * | 8/2021 | Chen | G10H 1/20 |
| 2021/0279030 | A1 * | 9/2021 | Morsy | G10H 1/0091 |
| 2023/0075074 | A1 * | 3/2023 | Bosch Vicente | G10H 1/0025 |
| 2023/0335091 | A1 * | 10/2023 | Morsy | G06F 1/165 |
| 2023/0360618 | A1 * | 11/2023 | Thio | G10H 1/0008 |
| 2024/0135905 | A1 * | 4/2024 | Yan | G10H 1/366 |

FOREIGN PATENT DOCUMENTS

| | | | | |
|---|---|---|---|---|
| GB | 2507284 A * | 4/2014 | | G10H 1/40 |
| WO | WO-8808190 A1 * | 10/1988 | | G11B 27/102 |

* cited by examiner

*Primary Examiner* — Christina M Schreiber
(74) *Attorney, Agent, or Firm* — Faegre Drinker Biddle & Reath LLP

(57) ABSTRACT

Systems and methods directed to combining audio tracks are provided. More specifically, a first audio track and a second audio track are received. The first audio track is separated into a vocal component and one or more accompaniment components. The second audio track is separated into a vocal component and one or more accompaniment components. A structure of the first audio track and a structure of the second audio track are determined. The first audio track and the second audio track are aligned based on the determined structures of the tracks. The vocal component of the first audio track is stretched to match a tempo of the second audio track. The stretched vocal component of the first audio track is added to the one or more accompaniment components of the second audio track.

20 Claims, 11 Drawing Sheets

AUTOMATIC AND INTERACTIVE MASHUP SYSTEM

BACKGROUND

A mashup is a creative work that is typically created by blending elements from two or more sources. In the context of music, a mashup is generally created by combining the vocal track from one song with the instrumental track from another song, and occasionally adding juxtaposition, or changing the keys or tempo. While mashups are a popular form of music creation, they require specialized knowledge regarding music composition that makes the process of creating them very difficult for most people. For example, to successfully create a mashup one must be able to analyze the key, beat, and structure of a song, know how to separate out the vocal and instrumental components, and then mix these components from different songs using the right effects and equalizers.

It is with respect to these and other general considerations that embodiments have been described. Also, although relatively specific problems have been discussed, it should be understood that the embodiments described herein should not be limited to solving the specific problems identified in the background.

SUMMARY

Aspects of the present disclosure generally relate to methods, systems, and media for combining audio tracks.

In one aspect, a computer-implemented method for combining audio tracks is provided. A first audio track and a second audio track are received. The first audio track is separated into a vocal component and one or more accompaniment components. The second audio track is separated into a vocal component and one or more accompaniment components. A structure of the first audio track and a structure of the second audio track are determined. The first audio track and the second audio track are aligned based on the determined structures of the tracks. The vocal component of the first audio track is stretched to match a tempo of the second audio track. The stretched vocal component of the first audio track is added to the one or more accompaniment components of the second audio track.

In another aspect, a system for combining audio tracks is provided. The system comprises at least one processor and a memory storing instructions that, when executed by the at least one processor, causes the system to perform a set of operations, the set of operations including: receiving a first audio track and a second audio track; separating the first audio track into a vocal component and one or more accompaniment components; separating the second audio track into a vocal component and one or more accompaniment components; determining a structure of the first audio track and a structure of the second audio track; aligning the first audio track and the second audio track based on the determined structures of the tracks; stretching the vocal component of the first audio track to match a tempo of the second audio track; and adding the stretched vocal component of the first audio track to the one or more accompaniment components of the second audio track.

In yet another aspect, a non-transient computer-readable storage medium is provided. The non-transient computer-readable storage medium comprising instructions being executable by one or more processors, that when executed by the one or more processors, cause the one or more processors to: receive a first audio track and a second audio track; separate the first audio track into a vocal component and one or more accompaniment components; separate the second audio track into a vocal component and one or more accompaniment components; determine a structure of the first audio track and a structure of the second audio track; align the first audio track and the second audio track based on the determined structures of the tracks; stretch the vocal component of the first audio track to match a tempo of the second audio track; and add the stretched vocal component of the first audio track to the one or more accompaniment components of the second audio track.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
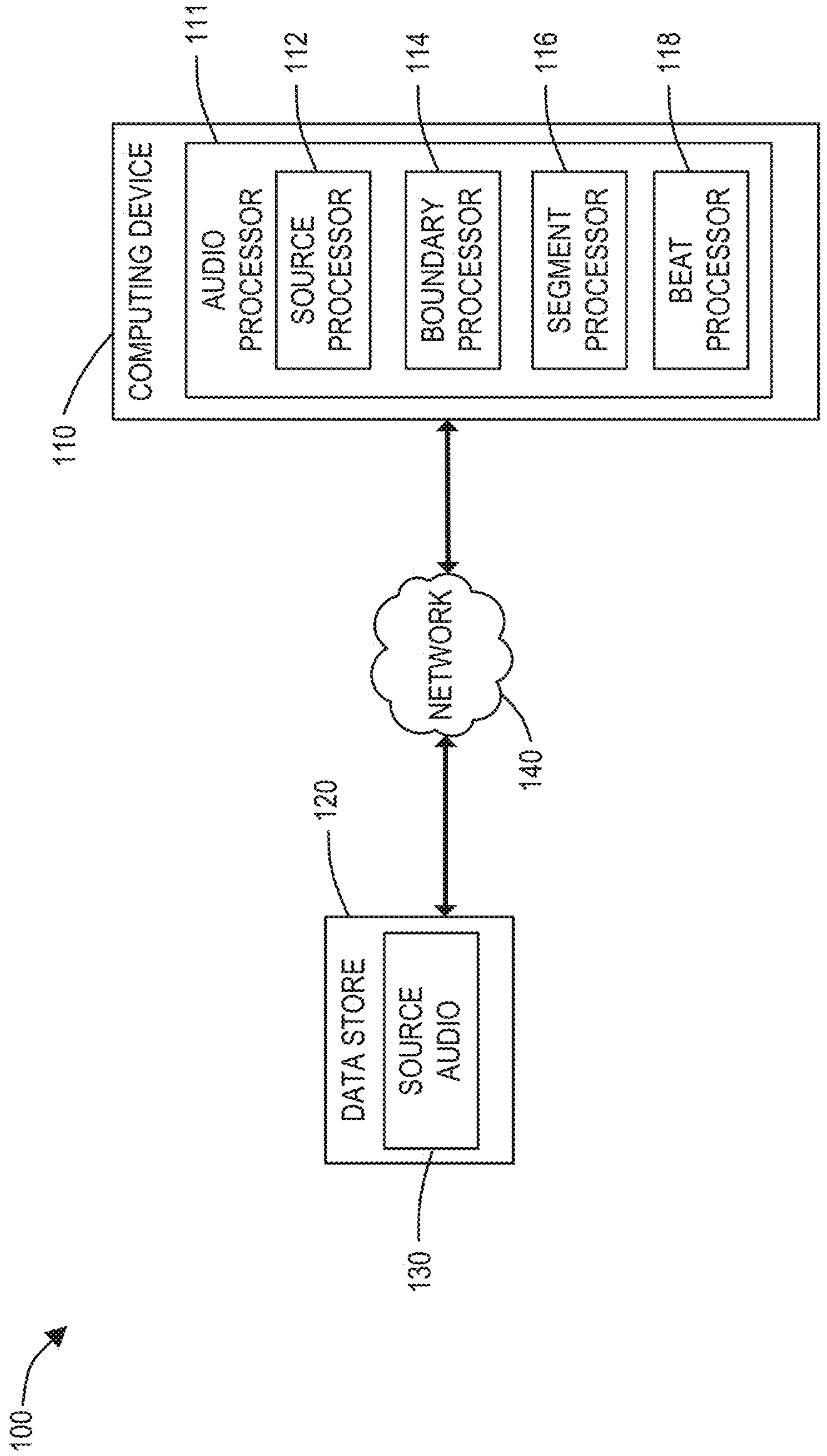
FIG. 1 shows a block diagram of an example of a system for combining audio tracks, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a computing device having an audio processor configured to create a new musical track that is a mashup of different, pre-existing audio tracks, such as, for example, musical tracks. In some examples, the audio processor can process and utilize a variety of information types. For example, the audio processor may be configured to process various types of audio signals or tracks, such as mixed original audio signals that include both a vocal component and an accompaniment (e.g., background instrumental) component, where the vocal component includes vocal content and the accompaniment component includes instrumental content (e.g., such as musical instrument content). In one example, the audio processor can separate each audio track into the different sources or components of audio, including, for example, a vocal component and one or more accompaniment components. Such accompaniment components of an audio track may include, for example, drums, bass, and the like.

In some examples, the audio processor can use song or track segmentation information and/or segment label information in the process of creating a mashup. For example, the audio processor can identify music theory labels for audio tracks. Non-overlapping segments within the audio tracks are labeled beforehand with suitable music theory labels. In some examples, the music theory labels correspond to music theory structures, such as introduction ("intro"), verse, chorus, bridge, outro, or other suitable labels. In other examples, the music theory labels correspond to non-structural music theory elements, such as vibrato, harmonics, chords, etc. In still other examples, the music theory labels correspond to key signature changes, tempo changes, etc. In some examples, the audio processor identifies music theory labels for segments that overlap, such as labels for key signatures, tempo changes, and structures (i.e., intro, verse, chorus).

In at least one embodiment, the system for combining audio tracks allows a user to select (e.g., input, designate, etc.) any two songs and the system will automatically create and output a mashup of the two songs. The system may also enable a user to play an interactive role in the mashup creation process, in an embodiment. In one example, the system may generate a visualization of the songs selected by the user, display the visualization via a user interface, and permit the user to make selections and/or adjustments to various characteristics of the songs during the process of creating the mashup. In this manner, the system allows users to create customized mashups of audio tracks.

This and many further embodiments for a computing device are described herein. For instance, FIG. 1 shows a block diagram of an example of a system 100 for combining audio tracks, according to an example embodiment. The system 100 includes a computing device 110 that is configured to create a mashup of at least two different audio tracks. In some examples, the computing device 110 is configured to perform music structure analysis for audio tracks or audio portions. The system 100 may also include a data store 120 that is communicatively coupled with the computing device 110 via a network 140, in some examples.

The computing device 110 may be any type of computing device, including a smartphone, mobile computer or mobile computing device (e.g., a Microsoft® Surface® device, a laptop computer, a notebook computer, a tablet computer such as an Apple iPad™ a netbook, etc.), or a stationary computing device such as a desktop computer or PC (personal computer). The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

Computing device 110 comprises an audio processor 111, in an embodiment. In the example shown in FIG. 1, the audio processor 111 includes a source processor 112, a boundary processor 114, a segment processor 116, and a beat processor 118. In other examples, one or more of the source processor 112, the boundary processor 114, the segment processor 116, and the beat processor 118 may be formed as a combined processor. In some examples, the computing device 110 may also include a neural network model that is trained using the audio processor 111 and configured to process an audio portion to provide segment boundary identifications and music theory labels within the audio portion. In other examples, at least some portions of the audio processor 111 may be combined with such a neural network model, for example, by including a neural network processor or other suitable processor configured to implement a neural network model.

The source processor 112 is configured to separate an audio track into different sources or components of audio that makeup the track. For example, the source processor 112 may receive an audio track and separate the audio track into a vocal component and one or more accompaniment components such as drums, bass, and various other instrumental accompaniments.

The boundary processor 114 is configured to generate segment boundary identifications within audio portions. For example, the boundary processor 114 may receive audio portions and identify boundaries within the audio portions that correspond to changes in a music theory label. Generally, the boundaries identify non-overlapping segments within a song or excerpt having a particular music theory label. As an example, an audio portion with a duration of 24 seconds may begin with a four second intro, followed by an 8 second verse, then a 10 second chorus, and a two second verse (e.g., a first part of a verse). In this example, the boundary processor 114 may generate segment boundary identifications at 4 seconds, 12 seconds, and 22 seconds. In some examples, the boundary processor 114 communicates with a neural network model or other suitable model to identify the boundaries within an audio track.

The segment processor 116 is configured to generate music theory label identifications for audio portions. In various examples, the music theory label identifications may be selected from a plurality of music theory labels. In some examples, at least some of the plurality of music theory labels denote a structural element of music. Examples of music theory labels may include introduction ("intro"), verse, chorus, bridge, instrumental (e.g., guitar solo or bass solo), outro, silence, or other suitable labels. In some examples, the segment processor 116 identifies a probability that a particular audio portion, or a section or timestamp within the particular audio portion, corresponds to a particular music theory label from the plurality of music theory labels. In other examples, the segment processor 116 identifies a most likely music theory label for the particular audio portion (or the section or timestamp within the particular audio portion). In still other examples, the segment processor 116 identifies start and stop times within the audio portion for when the music theory labels are active. In some examples, the segment processor 116 communicates with a neural network model or other suitable model to generate the music theory label identifications.

The beat processor 118 is configured to analyze the beat of an audio track and detect beat and downbeat timestamps within the audio track.

Data store 120 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 120 may store source audio 130 (e.g., audio tracks for user selection), for example. In some examples, the data store 120 provides the source audio 130 to the audio processor 111 for analysis and mashup. In some examples, one or more data stores 120 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 120 may be a datacenter in a distributed collection of datacenters.

Source audio 130 includes a plurality of audio tracks, such as songs, portions or excerpts from songs, etc. As used herein, an audio track may be a single song that contains several individual tracks, such as a guitar track, a drum track, a vocals track, etc., or may include only one track that is a single instrument or input, or a mixed track having multiple sub-tracks. Generally, the plurality of audio tracks within the source audio 130 are labeled with music theory labels for non-overlapping segments within the audio tracks. In some examples, different groups of audio tracks within the source audio 130 may be labeled with different music theory labels. For example, one group of audio tracks may use five labels (e.g., intro, verse, pre-chorus, chorus, outro), while another group uses seven labels (e.g., silence, intro, verse, refrain, bridge, instrumental, outro). Some groups may allow for segment sub-types (e.g., verse A, verse B) or compound labels (e.g., instrumental chorus). In some examples, the audio processor 111 is configured to convert labels among audio tracks from the different groups to use a same plurality of music theory labels.

Network 140 may comprise one or more networks such as local area networks (LANs), wide area networks (WANs), enterprise networks, the Internet, etc., and may include one or more of wired and/or wireless portions. Computing device 110 and data store 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

Figure 2:
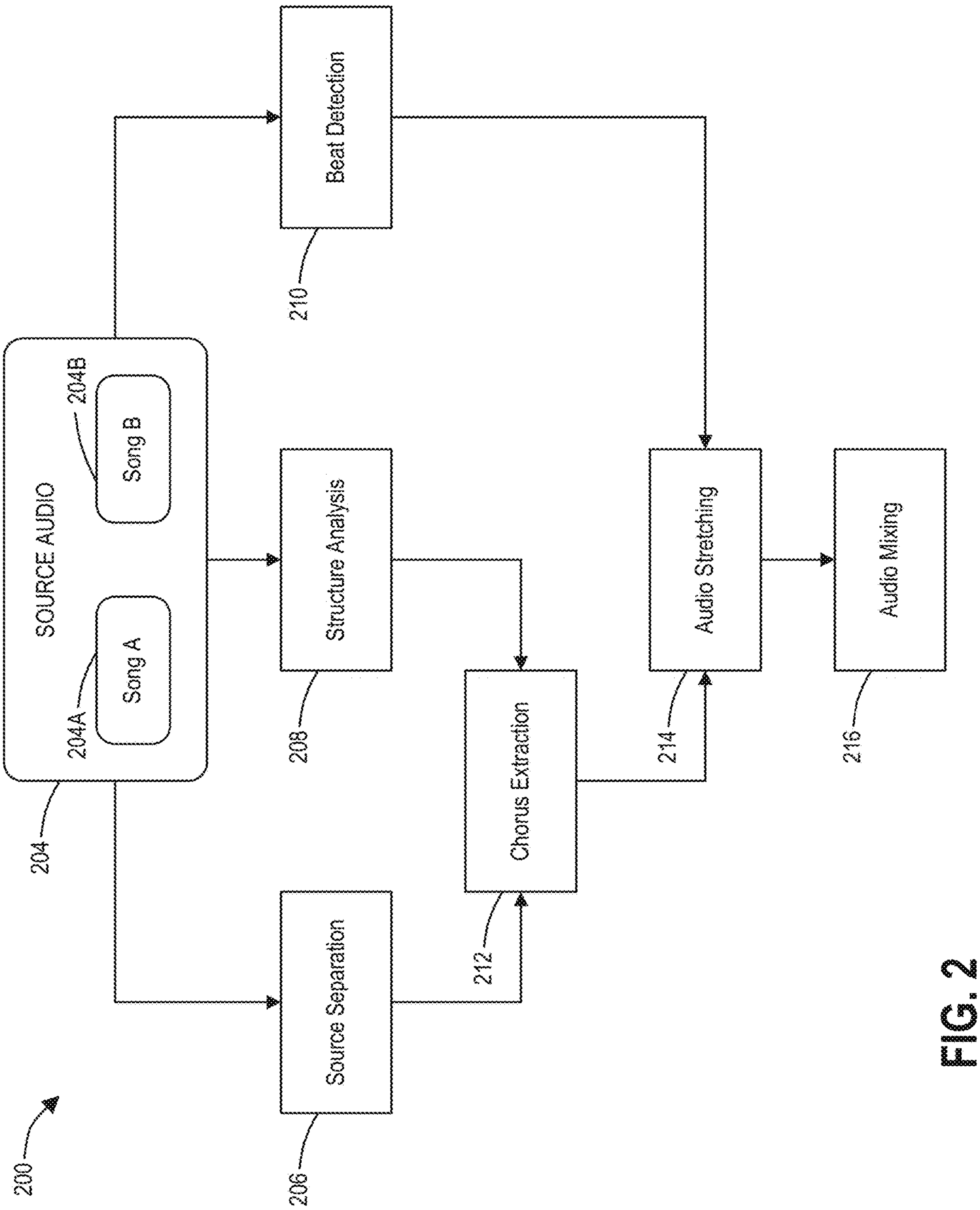
FIG. 2 shows a block diagram of an example logic flow for combining audio tracks, according to an example embodiment.

FIG. 2 is a block diagram showing an example logic flow 200 for combining audio tracks, according to an embodiment. In some examples, the audio processor 111 receives (e.g., based on a selection from a user) source audio 204 that is to be combined in a mashup, where the source audio 204 includes two existing audio tracks, song A 204A and song B 204B. The source audio 204 may correspond to the source audio 130 stored in the data store 120 of the example system 100 shown in FIG. 1 and described above.

In some examples, the audio processor 111 may take the received audio tracks (e.g., song A 204A and song B 204B) and perform various analyses on the audio tracks, including, for example, source separation 206, structure analysis 208, and beat detection 210. In one example, the audio processor 111 may perform these analyses by employing one or more music information retrieval algorithms Such music information retrieval algorithms may be implemented, for example, by one or more of the source processor 112, the boundary processor 114, the segment processor 116, and the beat processor 118 of the audio processor 111. Each of source separation 206, structure analysis 208, and beat detection 210 are further illustrated in FIGS. 3-5, respectively, and described in greater detail below.

In source separation 206, the source audio 204 received by the audio processor 111 is analyzed and separated into different audio components that make up each of song A 204A and song B 204B, in an embodiment. In one example, each of song A 204A and song B 204B may be analyzed by the source processor 112 to separate the vocal components of the songs from the accompaniment components of the songs.

Using the outputs from the source separation 206 and the structure analysis 208, chorus extraction 212 may be performed.

In one embodiment, once the structure and beat of the audio tracks are analyzed in the structure analysis 208 and beat detection 210, respectively, an audio stretch 214 may be applied to the vocal component of one of the audio tracks so that the vocal component matches the tempo of the other audio track. For example, the vocal component of song A 204A may undergo audio stretching 214 to match the tempo of song B 204B, where the tempo of song B 204B may be determined (e.g., estimated) based on data about the beat of song B 204B generated from the beat detection 210.

Following the audio stretching 214, the stretched vocal component of one of the audio tracks (e.g., song A 204A) may be combined with the one or more accompaniment components of the other audio track (e.g., song B 204B) during audio mixing 216.

Figure 3:
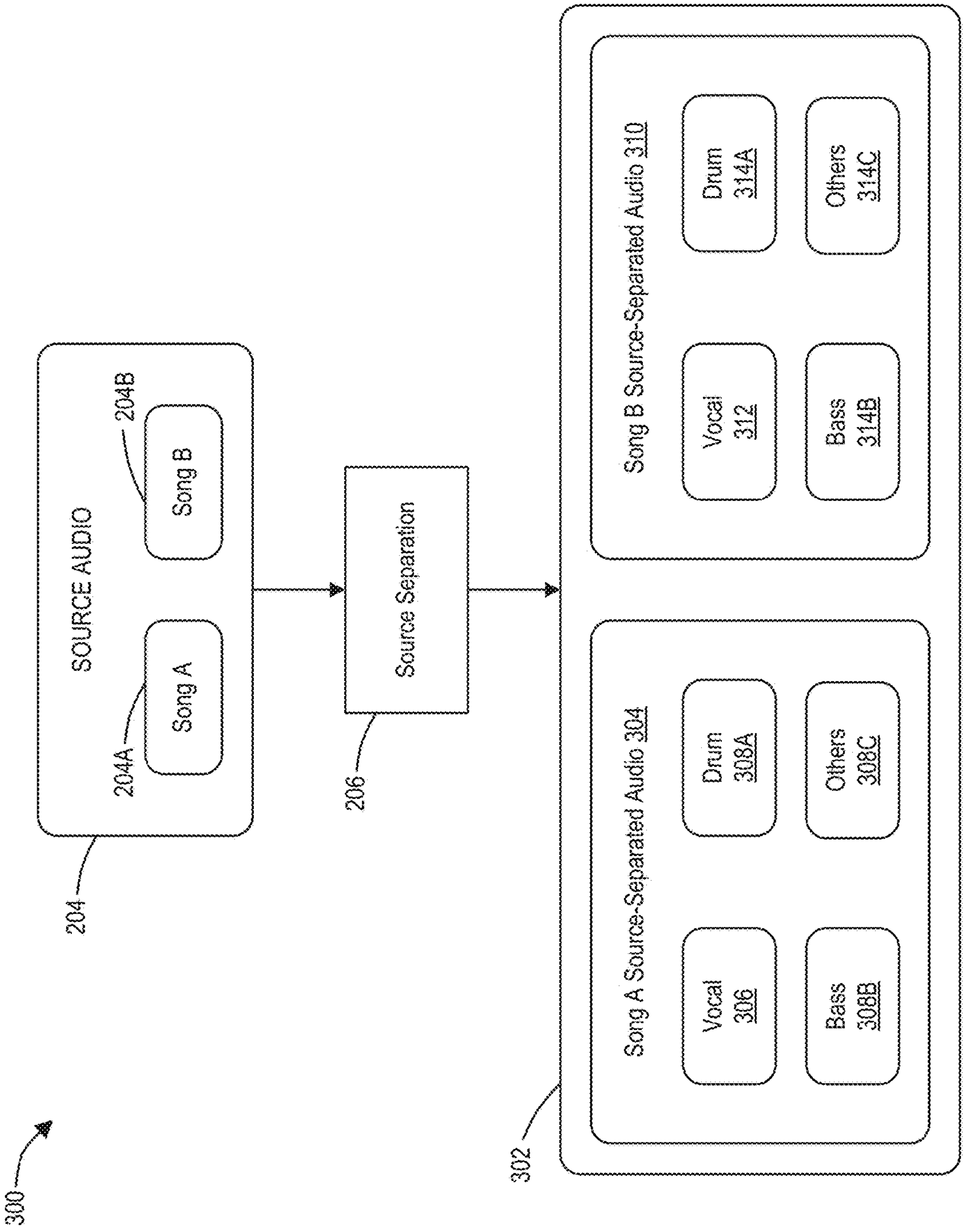
FIG. 3 shows a block diagram of an example data flow for separating components of an audio track, according to an example embodiment.

FIG. 3 is a block diagram showing an example data flow 300 for separating components of an audio track, according to an embodiment. In the example data flow 300, the source audio 204 received by the audio processor 111 may undergo source separation 206 to separate the different audio components that make up each of song A 204A and song B 204B. In one example, the source audio 204 may correspond to the source audio 130 stored in the data store 120 of the example system 100 shown in FIG. 1. During source separation 206, each of song A 204A and song B 204B may be analyzed, for example, by the source processor 112 to separate the vocal components of the songs from the accompaniment components of the songs.

As shown in the example data flow 300, audio data is both the input and the output of the source separation 206. For example, the source separation 206 is performed on the source audio 204 to generate source-separated audio 302, which may include song A source-separated audio 304 and song B source-separated audio 310. In the example illustrated, song A source-separated audio 304 includes a vocal component 306 and at least three accompaniment components 308, namely, a drum component 308A, a bass component 308B, and one or more other instrumental components 308C. The song B source-separated audio 310 also includes a vocal component 312 and at least three accompaniment components 314, which may be a drum component 314A, a bass component 314B, and one or more other instrumental components 314C.

Figure 4:
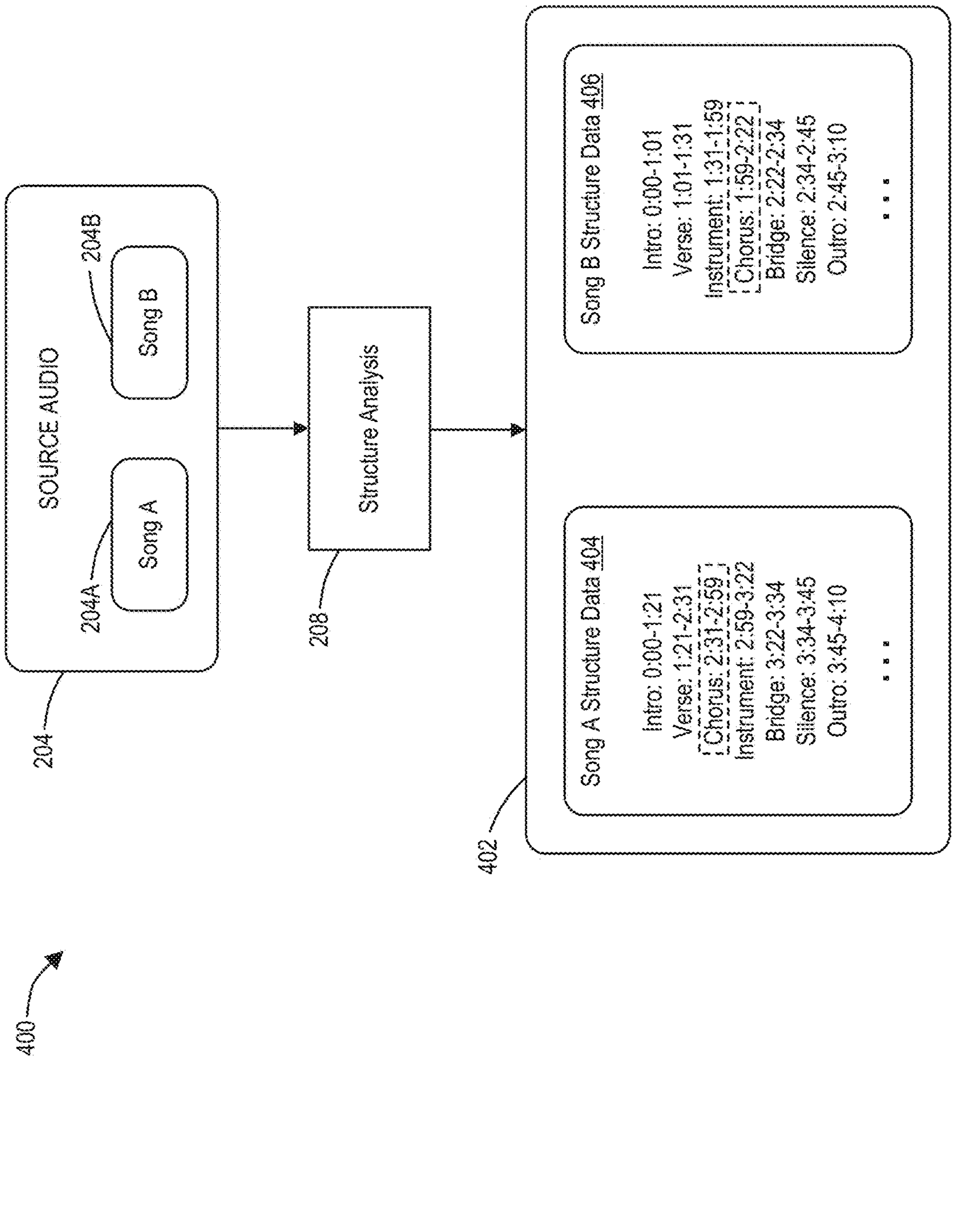
FIG. 4 shows a block diagram of an example data flow for analyzing the structure of an audio track, according to an example embodiment.

FIG. 4 is a block diagram showing an example data flow 400 for analyzing the structure of an audio track, according to an embodiment. In the example data flow 400, the source audio 204 received by the audio processor 111 may undergo structure analysis 208 to determine the structure of each of song A 204A and song B 204B. In one example, the source audio 204 may correspond to the source audio 130 stored in the data store 120 of the example system 100 shown in FIG. 1. During structure analysis 208, each of song A 204A and song B 204B may be analyzed, for example, by the boundary processor 114 and the segment processor 116 to determine the structure of each audio track.

As shown in the example data flow 400, the output of the structure analysis 208 is data about the structure of the audio tracks. For example, the structure analysis 208 is performed on the source audio 204 to generate structure data 402, which may include song A structure data 404 and song B structure data 406. In one embodiment, the audio processor 111 (e.g., the boundary processor 114 and/or the segment processor 116) is configured to receive the source audio 204 and generate music theory label identifications and segment boundary identifications. For example, the boundary processor 114 may be configured to generate segment boundary identifications within audio portions of each of song A 204A and song B 204B, and the segment processor 116 may be configured to generate music theory label identifications for segments identified by the segment boundary identifications, in an embodiment. In the example shown in FIG. 4, the song A structure data 404 and the song B structure data 406 include at least the following example music theory labels: an intro, a verse, a chorus, an instrument, a bridge, silence, and an outro. It should be understood that the above examples for how to obtain the structure data 402 of the source audio 204 are intended to be representative in nature, and, in other examples, the audio track segment boundary information and/or music theory labels may be obtained from any applicable source or in any suitable manner known in the art.

Figure 5:
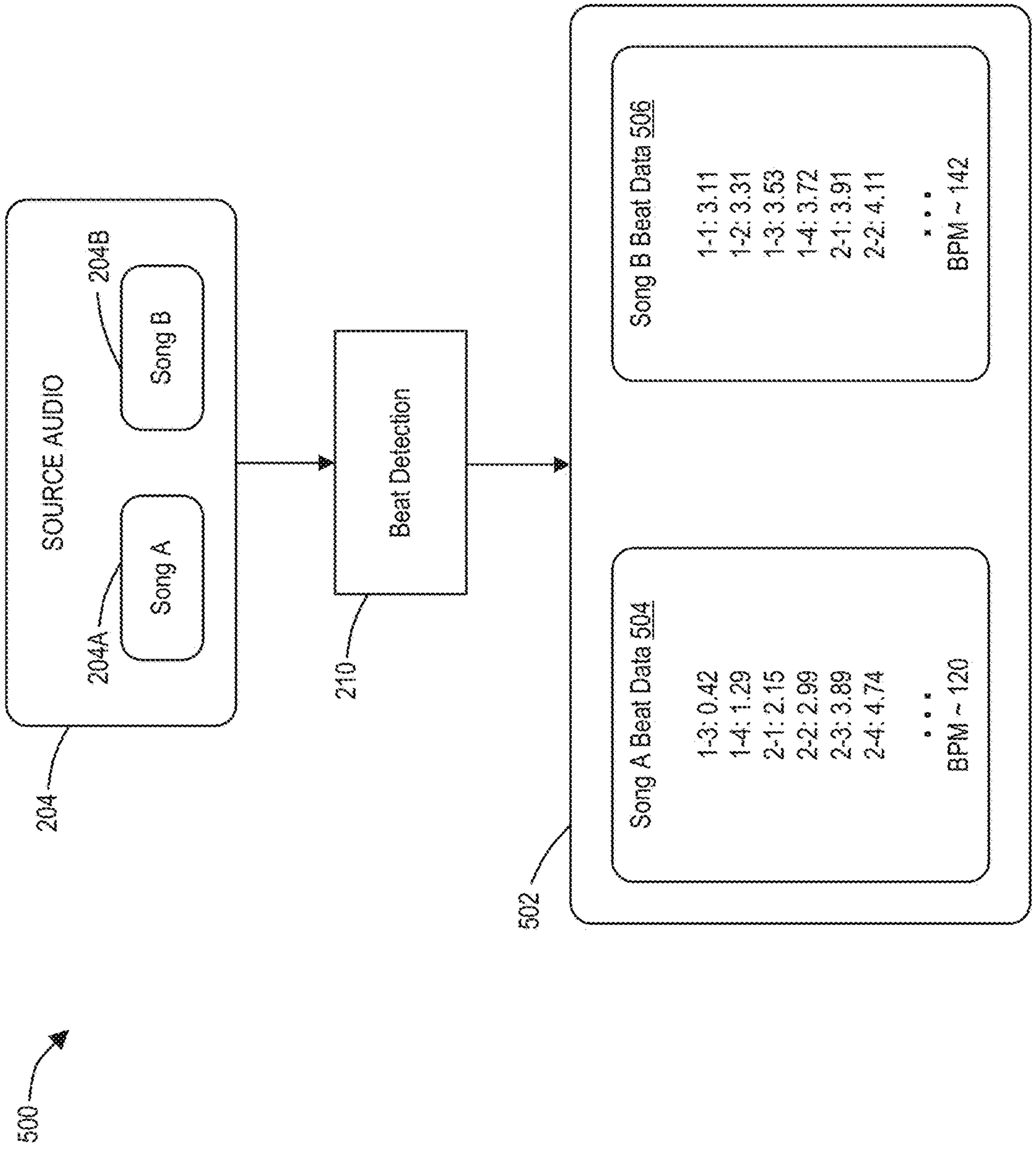
FIG. 5 shows a block diagram of an example data flow for analyzing beat in an audio track, according to an example embodiment.

FIG. 5 is a block diagram showing an example data flow 500 for analyzing beat in an audio track, according to an embodiment. In the example data flow 500, the source audio 204 received by the audio processor 111 may undergo beat detection 210 to determine a beat of each of song A 204A and song B 204B. In one example, the source audio 204 may correspond to the source audio 130 stored in the data store 120 of the example system 100 shown in FIG. 1. During beat detection 210, each of song A 204A and song B 204B may be analyzed, for example, by the beat processor 118 to determine a beat of each audio track. In one example, the beat processor 118 may infer or estimate a tempo for each of song A 204A and song B 204B based on the determined beat of each audio track.

As shown in the example data flow 500, the output of the beat detection 210 is data about the beat of the audio tracks. For example, the beat detection 210 is performed on the source audio 204 to generate beat data 502, which may include song A beat data 504 and song B beat data 506.

Figure 6:
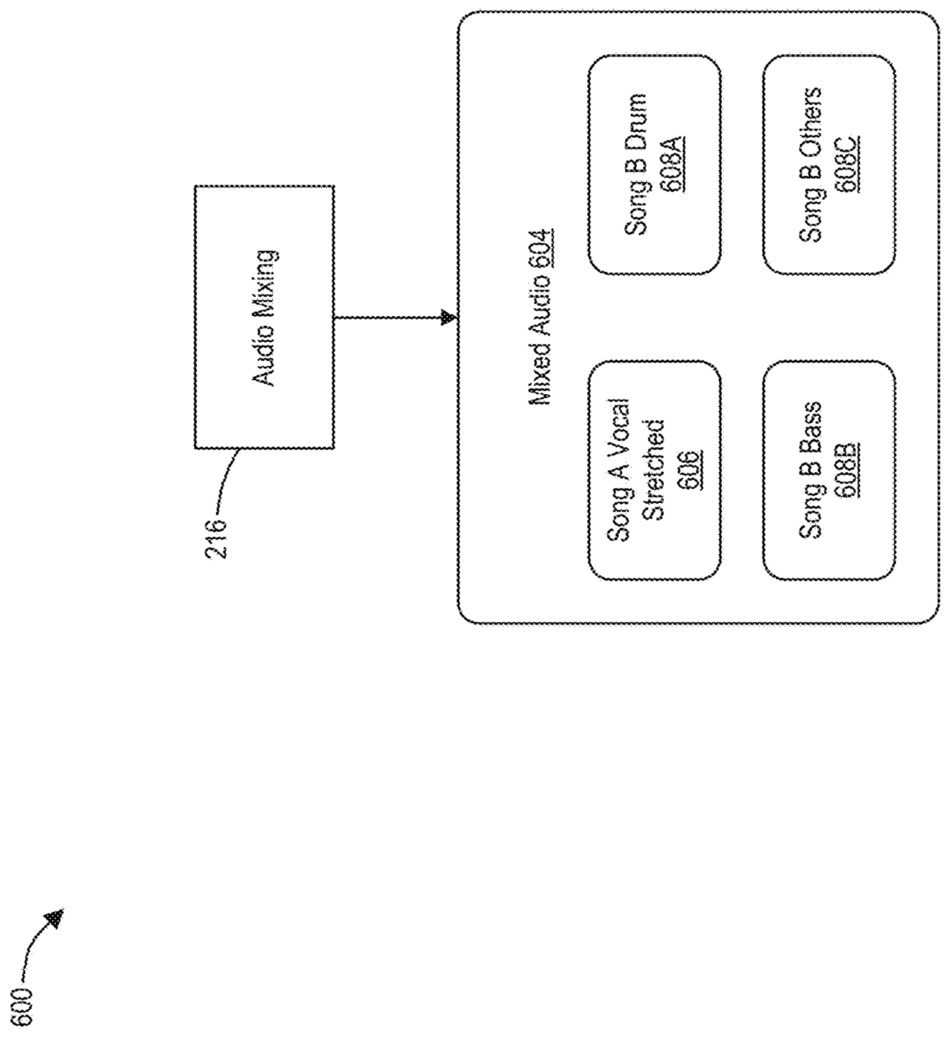
FIG. 6 shows a block diagram of an example data flow for outputting mixed audio, according to an example embodiment.

FIG. 6 is a block diagram showing an example data flow 600 for outputting mixed audio, according to an embodiment. As discussed above, following the audio stretching 214, the stretched vocal component of one of the audio tracks (e.g., song A 204A) may be combined with the one or more accompaniment components of the other audio track (e.g., song B 204B) during audio mixing 216. In one example, the output of the audio mixing 216 is mixed audio 604, which may include, for example, the stretched song A vocal component 606, the song B drum component 608A, the song B bass component 608B, and one or more other song B instrumental components 608C.

Figure 7A:
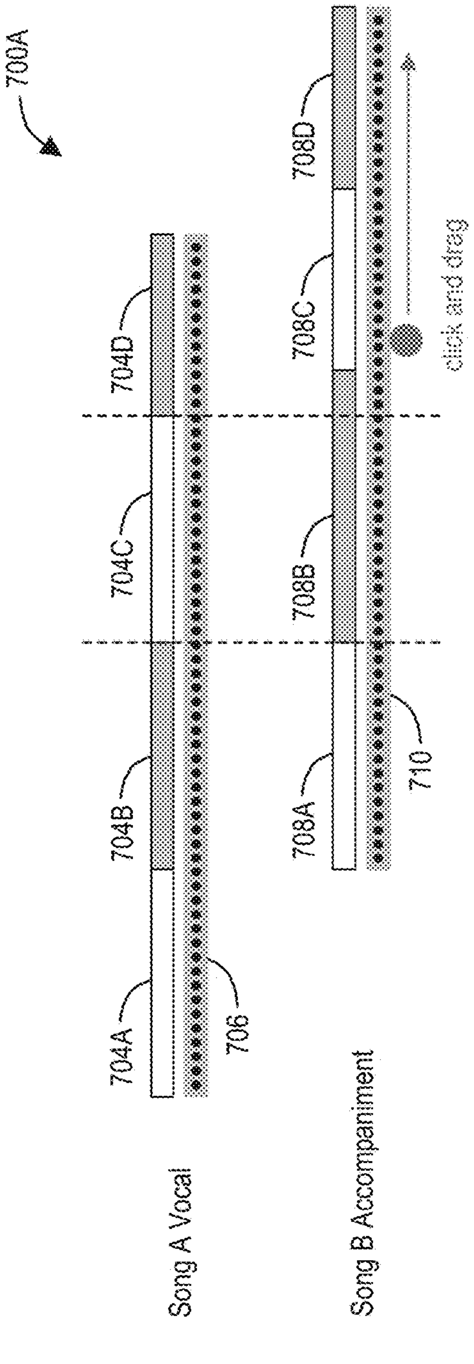
FIGS. 7A and 7B show example visualizations of characteristics of audio tracks, according to an example embodiment.
Figure 7B:
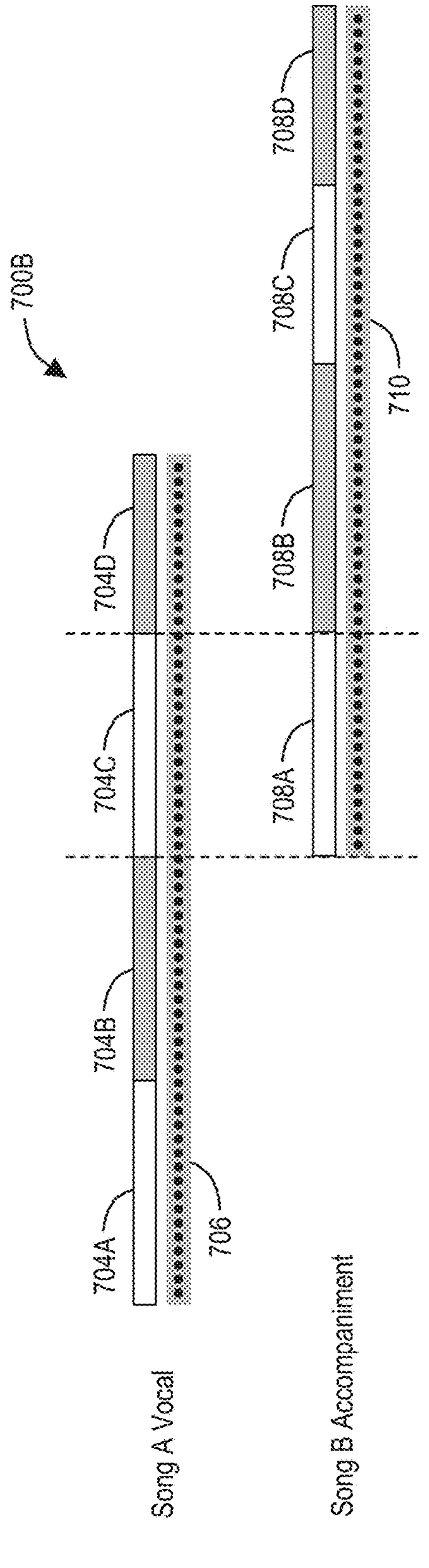

FIGS. 7A and 7B show example visualizations 700A and 700B of characteristics of audio tracks, according to an embodiment. In an example, the visualizations 700A and 700B may be generated in a manner suitable for display to a user via a graphical user interface. The example visualizations 700A and 700B may be presented to a user to enable the user to play an interactive role in the mashup creation process. The example visualizations 700A and 700B shown include structure and beat information for a vocal component of song A (e.g., vocal component 306 of song A source-separated audio 304 in FIG. 3) and for an accompaniment component of song B (e.g., one of drum component 314A, bass component 314B, or other instrumental component 314C of song B source-separated audio 310 in FIG. 3).

In the example visualizations 700A and 700B, the vocal component of song A is visualized by sections 704A, 704B, 704C, and 704D, and beats 706, while the accompaniment component of song B is visualized by sections 708A, 708B, 708C, and 708D, and beats 710. In an example scenario, if a user wishes to align section 704C of the song A vocal component with section 708A of the song B accompaniment component, the user may interact (e.g., via a graphical user interface) with the visualization 700A by dragging the song B accompaniment component so that those two sections are aligned, as shown in the visualization 700B.

Figure 8:
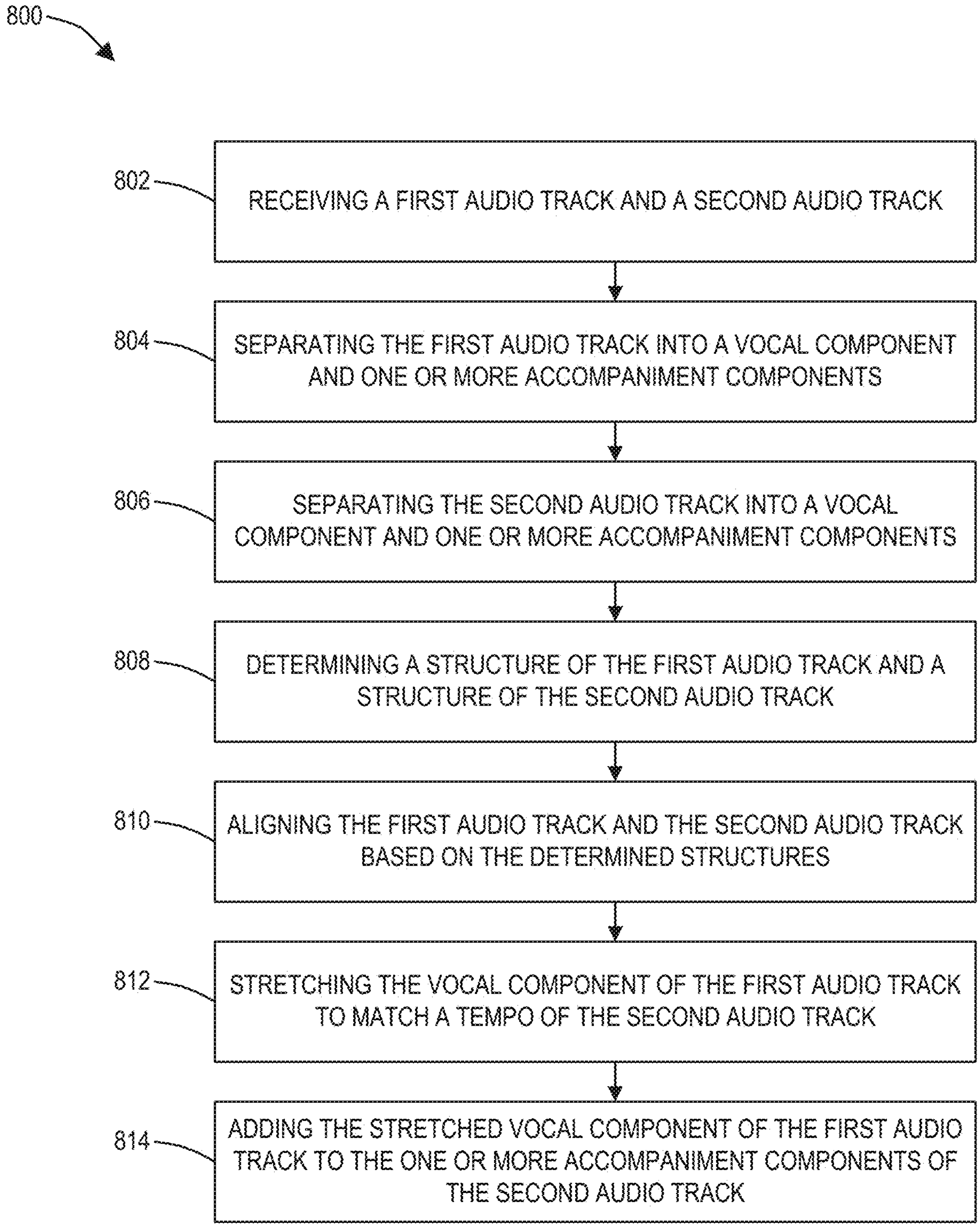
FIG. 8 shows a flowchart of an example method of combining audio tracks, according to an example embodiment.

FIG. 8 shows a flowchart of an example method 800 for combining audio tracks, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 8. Steps may be performed serially, in a partially overlapping manner, or fully in parallel. Thus, the order in which steps of method 800 are performed may vary from one performance of the process to another performance of the process. Steps may also be omitted, combined, renamed, regrouped, be performed on one or more machines, or otherwise depart from the illustrated flow, provided that the process performed is operable and conforms to at least one claim. The steps of FIG. 8 may be performed by the computing device 110 (e.g., via the audio processor 111), or other suitable computing device.

Method 800 begins with step 802. At step 802, a first audio track and a second audio track are received. The first and second audio tracks may correspond to song A 204A and song B 204B in FIGS. 2-5, in some examples. The first and second audio tracks may be based upon a selection from a user and, in some examples, are different from one another. In one example, the first and second audio tracks may be received at step 802 from the source audio 130 stored in the data store 120 of the example system 100 shown in FIG. 1. In some examples, segments within each of the first and second audio tracks are non-overlapping with each other. In other words, one music structural element does not overlap with another.

At step 804, the first audio track may be separated into a vocal component and one or more accompaniment components. In one example, the one or more accompaniment components may include a drum component, a bass component, and one or more other instrumental components of the first audio track.

At step 806, the second audio track may be separated into a vocal component and one or more accompaniment components. In one example, the one or more accompaniment components may include a drum component, a bass component, and one or more other instrumental components of the second audio track.

At step 808, a structure of the first audio track and a structure of the second audio track may be determined. In some examples, step 808 may include identifying segments within the first audio track and segments within the second audio track, and identifying music theory labels for the identified segments within the first audio track and for the identified segments within the second audio track.

At step 810, the first audio track and the second audio track may be aligned based on the determined structures. In one example, the first audio track and the second audio track may be aligned based on the identified segments and music theory labels for the first audio track and the second audio track (which may be identified at step 808).

At step 812, the vocal component of the first audio track may be stretched to match a tempo of the second audio track. In one example, stretching the vocal component of the first audio track to match a tempo of the second audio track comprises at step 812 includes detecting beat and downbeat timestamps for the first audio track and for the second audio track, and estimating the tempo of the second audio track based on the detected beat and downbeat timestamps for the second audio track.

At step 814, the stretched vocal component of the first audio track may be added to the one or more accompaniment components of the second audio track.

Figure 9:
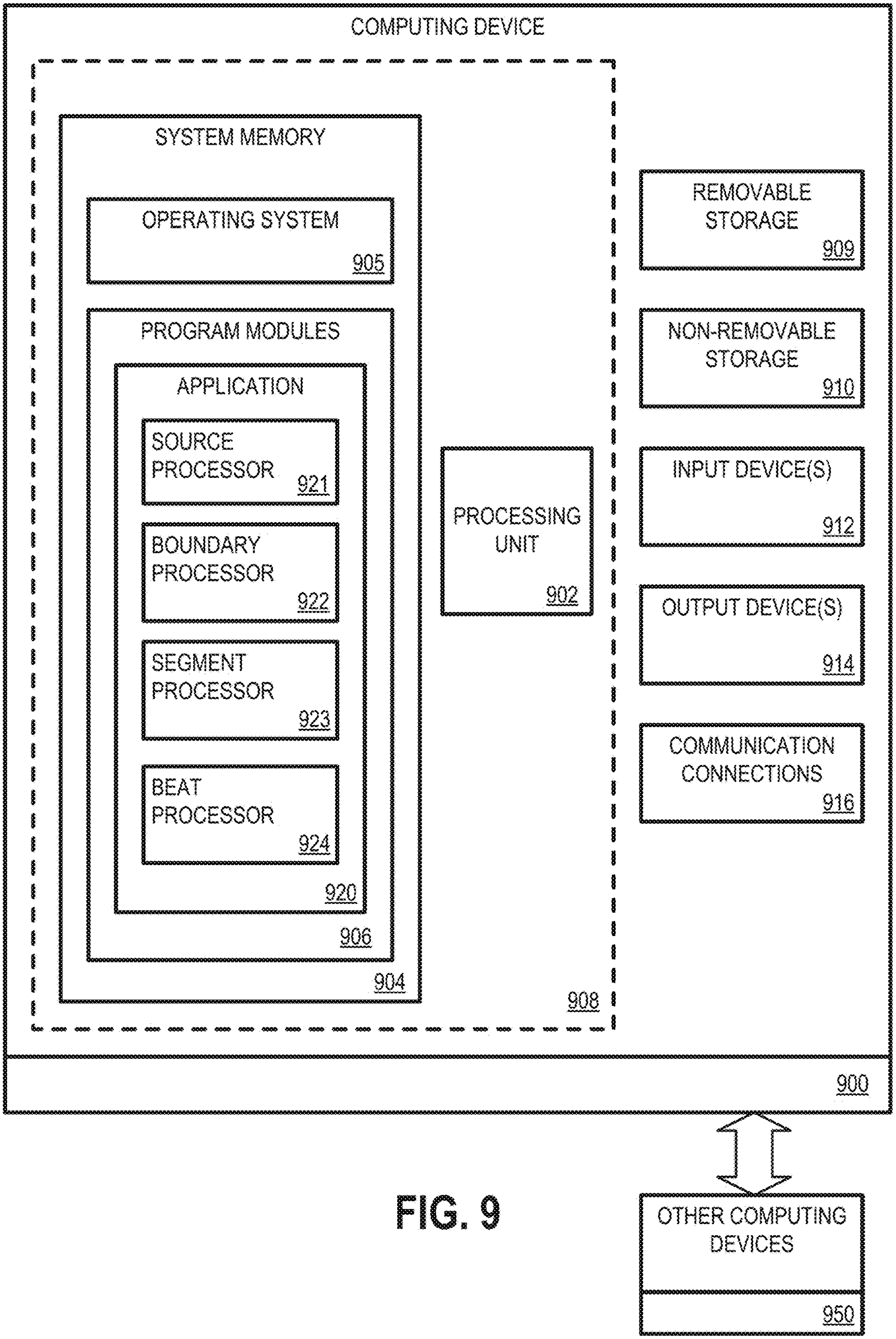
FIG. 9 is a block diagram illustrating example physical components of a computing device with which aspects of the disclosure may be practiced.
Figure 10:
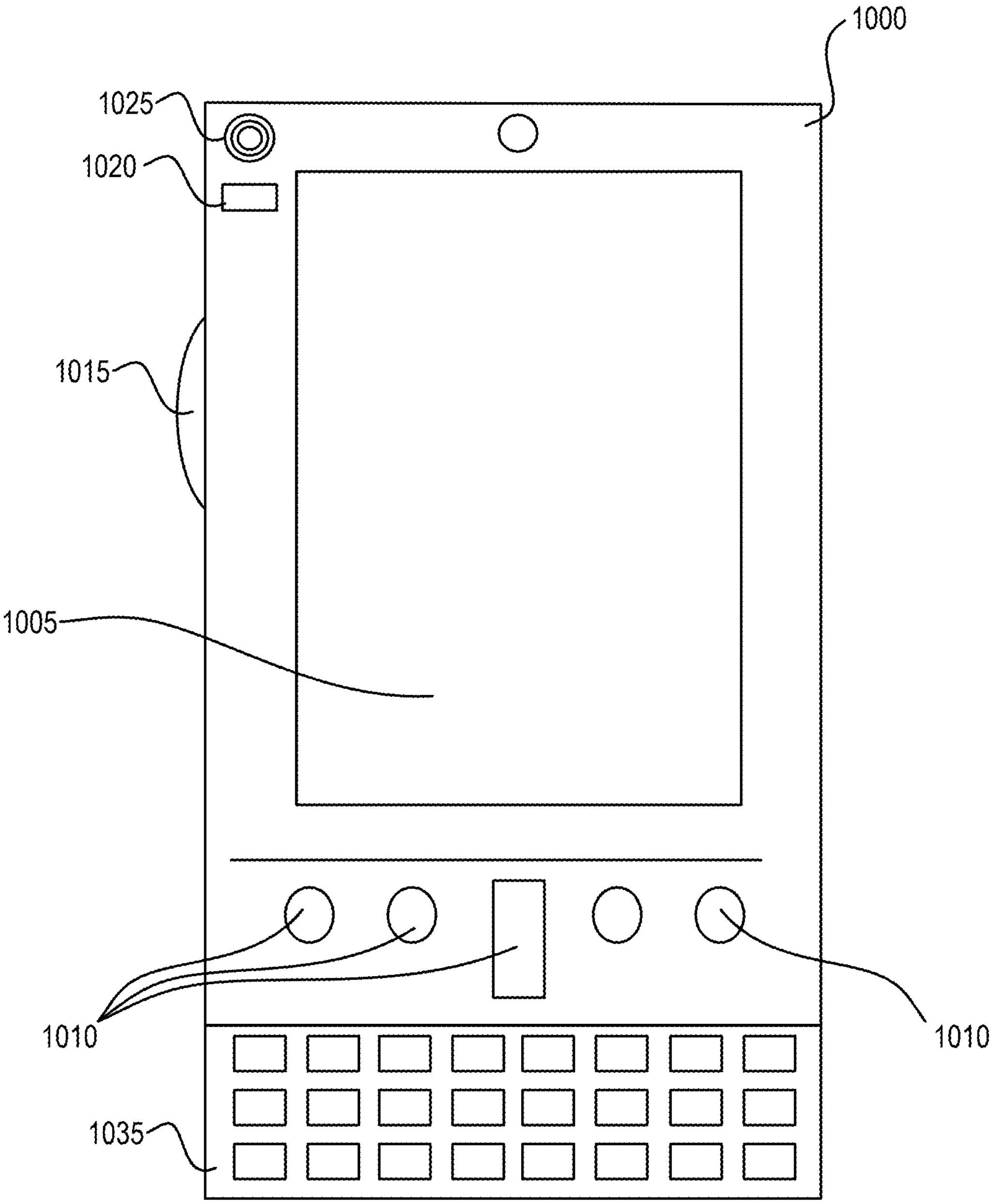
FIGS. 10 and 11 are simplified block diagrams of a mobile computing device with which aspects of the present disclosure may be practiced.
Figure 11:
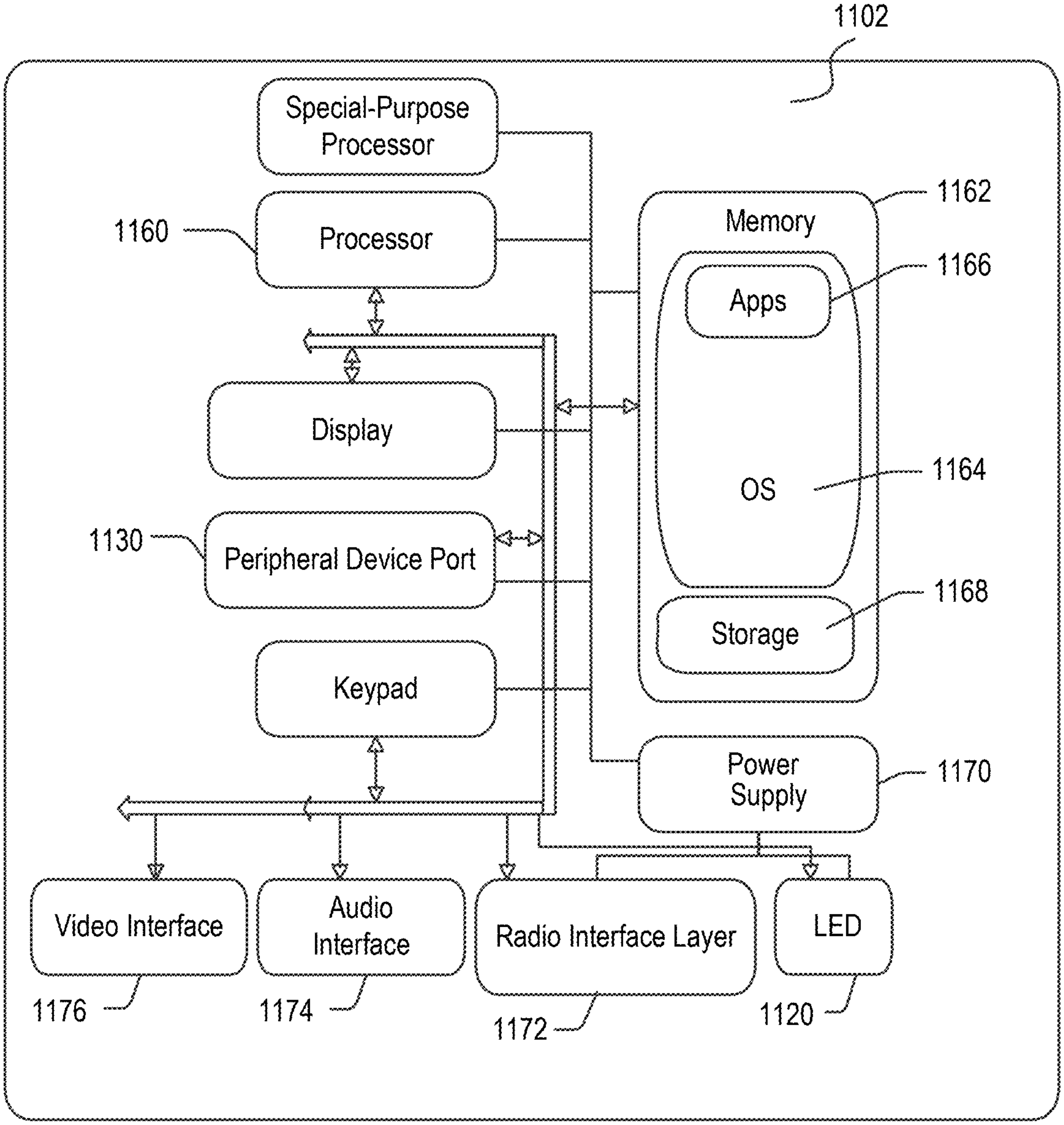

FIGS. 9, 10, and 11, and the associated descriptions provide a discussion of a variety of operating environments in which aspects of the disclosure may be practiced. However, the devices and systems illustrated and discussed with respect to FIGS. 9, 10, and 11 are for purposes of example and illustration and are not limiting of a vast number of computing device configurations that may be utilized for practicing aspects of the disclosure, as described herein.

FIG. 9 is a block diagram illustrating physical components (e.g., hardware) of a computing device 900 with which aspects of the disclosure may be practiced. The computing device components described below may have computer executable instructions for implementing an audio track mashup application 920 on a computing device (e.g., computing device 110), including computer executable instructions for audio track mashup application 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running audio track mashup application 920, such as one or more components with regard to FIGS. 1-6, in particular, source processor 921 (corresponding to source processor 112), boundary processor 922 (e.g., corresponding to boundary processor 114), segment processor 923 (e.g., corresponding to segment processor 116), and beat processor 924 (e.g., corresponding to beat processor 118).

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 8 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., audio track mashup application 920) may perform processes including, but not limited to, the aspects, as described herein. Other program modules that may be used in accordance with aspects of the present disclosure, and in particular for combining audio tracks, may include source processor 921, boundary processor 922, segment processor 923, and beat processor 924.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10 and 11 illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1000 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer (e.g., audio transducer 1025 illustrated in FIG. 10). In the illustrated embodiment, the visual indicator 1120 is a light emitting diode (LED) and the audio transducer 1025 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1000 implementing the system 1102 may have additional features or functionality. For example, the mobile computing device 1000 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1000 and stored via the system 1102 may be stored locally on the mobile computing device 1000, as described above, or the data may be stored on any number of storage media that may be accessed by the device via the radio interface layer 1172 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 10 and 11 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for combining audio tracks, the method comprising:
- receiving a first audio track and a second audio track;
- separating the first audio track into a vocal component and one or more accompaniment components;
- separating the second audio track into a vocal component and one or more accompaniment components;
- determining a structure of the first audio track and a structure of the second audio track;
- aligning the vocal component of the first audio track and one of the one or more accompaniment components of the second audio track based on the determined structures of the tracks;
- displaying, on a user interface, a visualization of the vocal component of the first audio track and the one or more accompaniment components of the second audio track at a first alignment;
- adjusting the first alignment upon receiving, via the user interface, a user input corresponding to a change in an alignment between sections of the vocal component of the first audio track and sections of the one or more accompaniment components of the second audio track;
- stretching the vocal component of the first audio track to match a tempo of the second audio track; and
- generating a mixed audio by adding the stretched vocal component of the first audio track to the one or more accompaniment components of the second audio track.

2. The computer-implemented method of claim 1, wherein determining a structure of the first audio track and of the second audio track comprises:
- identifying segments within the first audio track and segments within the second audio track; and
- identifying music theory labels for the segments within the first audio track and for the segments within the second audio track.

3. The computer-implemented method of claim 2, wherein the first audio track and the second audio track are aligned based on the identified segments and music theory labels for the first audio track and the second audio track.

4. The computer-implemented method of claim 1,
- wherein the visualization shows the alignment between the sections of the vocal component of the first audio track and the sections of the one or more accompaniment components of the second audio track.

5. The computer-implemented method of claim 4, further comprising:
- displaying, on the user interface, an updated visualization showing the changed alignment between the sections of the vocal component of the first audio track and the sections of the one or more accompaniment components of the second audio track.

6. The computer-implemented method of claim 1, wherein the one or more accompaniment components of the first audio track and the second audio track are one or more instrumental components.

7. The computer-implemented method of claim 1, wherein stretching the vocal component of the first audio track to match a tempo of the second audio track comprises:
- detecting beat and downbeat timestamps for the first audio track and for the second audio track;
- estimating a tempo of the second audio track based on the detected beat and downbeat timestamps for the second audio track; and
- applying a stretch to the vocal component of the first audio track to match the estimated tempo of the second audio track.

8. A system for combining audio tracks, the system comprising:
- at least one processor; and
- a memory storing instructions that, when executed by the at least one processor, causes the system to perform a set of operations, the set of operations including:
- receiving a first audio track and a second audio track;
- separating the first audio track into a vocal component and one or more accompaniment components;
- separating the second audio track into a vocal component and one or more accompaniment components;
- determining a structure of the first audio track and a structure of the second audio track;

aligning the vocal component of the first audio track and one of the one or more accompaniment components of the second audio track based on the determined structures of the tracks;

displaying, on a user interface, a visualization of the vocal component of the first audio track and the one or more accompaniment components of the second audio track at a first alignment;

adjusting the first alignment upon receiving, via the user interface, a user input corresponding to a change in an alignment between sections of the vocal component of the first audio track and sections of the one or more accompaniment components of the second audio track;

stretching the vocal component of the first audio track to match a tempo of the second audio track; and generating a mixed audio by adding the stretched vocal component of the first audio track to the one or more accompaniment components of the second audio track.

9. The system of claim 8, wherein the set of operations includes:

identifying segments within the first audio track and segments within the second audio track; and identifying music theory labels for the segments within the first audio track and for the segments within the second audio track.

10. The system of claim 9, wherein the first audio track and the second audio track are aligned based on the identified segments and music theory labels for the first audio track and the second audio track.

11. The system of claim 8, wherein the visualization shows the alignment between the sections of the vocal component of the first audio track and the sections of the one or more accompaniment components of the second audio track.

12. The system of claim 11, wherein the set of operations includes:

displaying, on the user interface, an updated visualization showing the changed alignment between the sections of the vocal component of the first audio track and the sections of the one or more accompaniment components of the second audio track.

13. The system of claim 8, wherein the one or more accompaniment components of the first audio track and the second audio track are one or more instrumental components.

14. The system of claim 8, wherein the set of operations includes:

detecting beat and downbeat timestamps for the first audio track and for the second audio track;

estimating a tempo of the second audio track based on the detected beat and downbeat timestamps for the second audio track; and applying a stretch to the vocal component of the first audio track to match the estimated tempo of the second audio track.

15. A non-transient computer-readable storage medium comprising instructions being executable by one or more processors, that when executed by the one or more processors, cause the one or more processors to:

receive a first audio track and a second audio track;

separate the first audio track into a vocal component and one or more accompaniment components;

separate the second audio track into a vocal component and one or more accompaniment components;

determine a structure of the first audio track and a structure of the second audio track;

align the vocal component of the first audio track and one of the one or more accompaniment components of the second audio track based on the determined structures of the tracks;

display, on a user interface, a visualization of the vocal component of the first audio track and the one or more accompaniment components of the second audio track at a first alignment;

adjust the first alignment upon receiving, via the user interface, a user input corresponding to a change in an alignment between the sections of the vocal component of the first audio track and the sections of the one or more accompaniment components of the second audio track;

stretch the vocal component of the first audio track to match a tempo of the second audio track; and generate a mixed audio by adding the stretched vocal component of the first audio track to the one or more accompaniment components of the second audio track.

16. The computer-readable storage medium of claim 15, wherein the instructions are executable by the one or more processors to cause the one or more processors to:

identify segments within the first audio track and segments within the second audio track; and identify music theory labels for the segments within the first audio track and for the segments within the second audio track.

17. The computer-readable storage medium of claim 15, wherein the visualization shows the alignment between the sections of the vocal component of the first audio track and the sections of the one or more accompaniment components of the second audio track.

18. The computer-readable storage medium of claim 17, wherein the instructions are executable by the one or more processors to cause the one or more processors to:

display, on the user interface, an updated visualization showing the changed alignment between the sections of the vocal component of the first audio track and the sections of the one or more accompaniment components of the second audio track.

19. The computer-readable storage medium of claim 15, wherein the one or more accompaniment components of the first audio track and the second audio track are one or more instrumental components.

20. The computer-readable storage medium of claim 15, wherein the instructions are executable by the one or more processors to cause the one or more processors to:

detect beat and downbeat timestamps for the first audio track and for the second audio track;

estimate a tempo of the second audio track based on the detected beat and downbeat timestamps for the second audio track; and apply a stretch to the vocal component of the first audio track to match the estimated tempo of the second audio track.

* * * * *